No. 785,881. PATENTED MAR. 28, 1905.
J. W. HILL.
CONNECTING LINK FOR CHAINS AND CHAIN CABLES.
APPLICATION FILED APR. 12, 1904.

3 SHEETS—SHEET 1.

Witnesses

Inventor.
Joseph William Hill

No. 785,881. PATENTED MAR. 28, 1905.
J. W. HILL.
CONNECTING LINK FOR CHAINS AND CHAIN CABLES.
APPLICATION FILED APR. 12, 1904.

3 SHEETS—SHEET 3.

Witnesses.
Inventor:
Joseph William Hill
By Richardson
attys

No. 785,881.

Patented March 28, 1905.

UNITED STATES PATENT OFFICE.

JOSEPH WILLIAM HILL, OF STOURBRIDGE, ENGLAND, ASSIGNOR TO STANLEY CHARLES PAUL, OF STOURBRIDGE, ENGLAND.

CONNECTING-LINK FOR CHAINS AND CHAIN CABLES.

SPECIFICATION forming part of Letters Patent No. 785,881, dated March 28, 1905.

Application filed April 12, 1904. Serial No. 202,862.

*To all whom it may concern:*

Be it known that I, JOSEPH WILLIAM HILL, mechanical engineer, a subject of His Majesty the King of Great Britain and Ireland and of the British Dominions Beyond the Seas, Emperor of India, residing at 14 Heath street, Stourbridge, in the county of Worcester, England, have invented a certain new and useful Improved Connecting-Link for Chains and Chain Cables, of which the following is a specification.

This invention consists of the herein-described improved connecting-link for chains and chain cables, which is so constructed that it is stronger than an ordinary chain or chain-cable link of nominally the same size, and it can readily be applied to take the place of a broken link, than which it occupies no more space, and, moreover, when my improved connecting-link has withstood the breaking strain of the chain or chain cable with which it is used its parts can nevertheless very readily be separated and reassembled and connected together, which is very difficult with most other connecting-links when they have been subjected to a heavy strain and their parts distorted. Moreover, my improved connecting-link is so constructed that it is absolutely secure.

I will describe my invention by referring to the accompanying drawings, on which—

Figure 1:
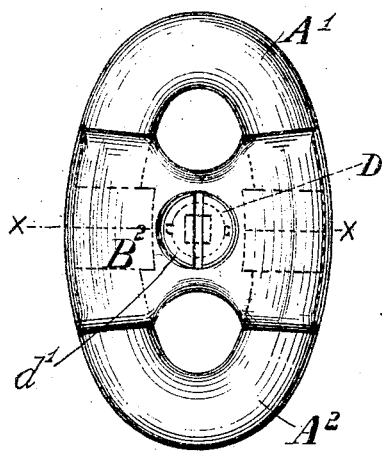
Figure 2:
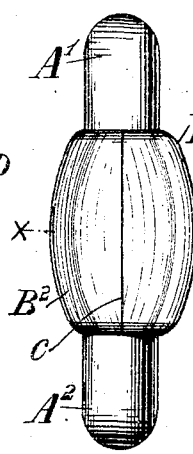
Figure 4:
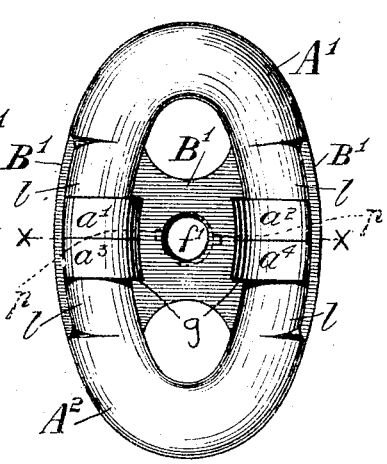
Figure 3:
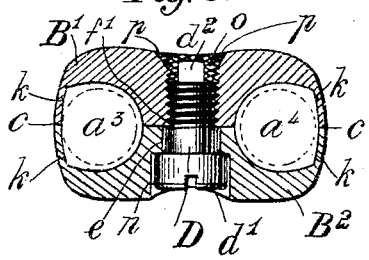
Figure 5:
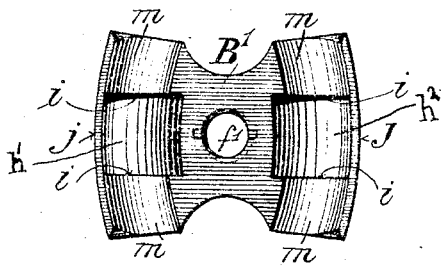
Figure 6:
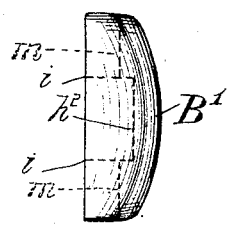
Figure 7:
Figure 8:
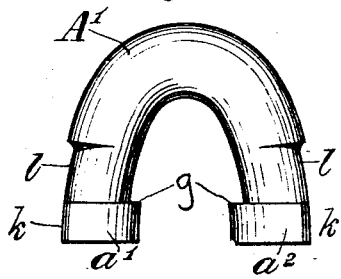
Figure 10:
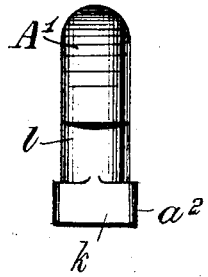
Figure 9:
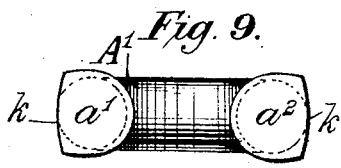
Figure 11:
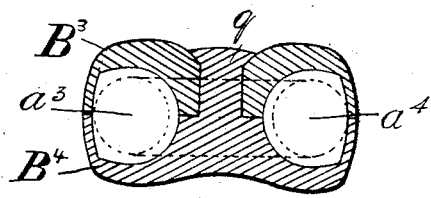
Figure 12:
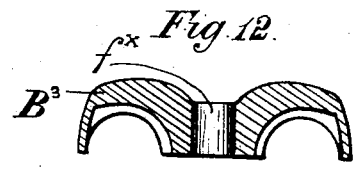
Figure 13:
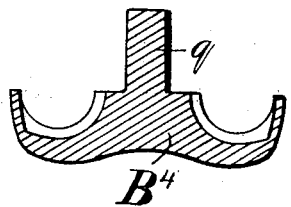

Figure 1 is a front view of a connecting-link constructed in accordance with this invention. Fig. 2 is a side view of the same, and Fig. 3 is a sectional plan of the same on line X X of Figs. 1 and 2. Fig. 4 is a front elevation of the same connecting-link with some parts removed to show the interior. Fig. 5 is a front elevation of one half of the box-like part of the connecting-link. Fig. 6 is a side elevation of the same, and Fig. 7 is a plan of the same. Fig. 8 is a front elevation of one of the halves of the same connecting-link. Fig. 9 is an inverted plan of the same, and Fig. 10 is a side elevation of the same. Fig. 11 is a cross-sectional plan of a slightly-modified form of my improved connecting-link. Fig. 12 is a sectional plan of one of the box-like parts of the same connecting-link shown by Fig. 11, and Fig. 13 is a sectional plan of the other half of the box-like part of the connecting-link shown by Fig. 11.

The same letters of reference indicate the same or corresponding parts in all the figures.

In carrying out my invention I make the oval link in halves, which are marked, respectively, A' A², the division being at X X—that is, on the shorter diameter of the link. Thus each half somewhat resembles the letter U. These two parts A' A² abut together, and where they abut they are formed with heads or enlargements. The heads or enlargements of the half-link A' are marked, respectively, $a'$ $a^2$, and the corresponding heads or enlargements of the half-link A² are marked $a^3$ $a^4$. These heads or enlargements $a'$ $a^2$ $a^3$ $a^4$, together with portions of the two half-links A' A², are inclosed in a box-like part which is made in halves, marked, respectively, B' B², the division being on the line $c$, Figs. 2 and 3, which is on the central plane of the link. These halves B' B² of the box-like part are secured together by the central screw-pin D or by a rivet or the like which passes through a central hole $e$ in the half-box B² and screws into a corresponding hole $f$ in the other half-box B', this hole $f$ being tapped to receive the screw. The heads or enlargements $a'$ $a^2$ $a^3$ $a^4$ of the half-links are made with square shoulders $g$, and each of the halves B' B² of the box-like part is recessed at $h'$ to receive the heads $a'$ $a^3$ and at $h^2$ to receive the heads $a^2$ $a^4$, and these recesses are shaped so as to accurately fit the said heads, the shoulders $g$ of which take against corresponding shoulders or rabbets $i$ at the terminations of the recesses $h'$ $h^2$.

In order that the width at $j j$, Fig. 5, across the outside of the box-like part B' B² shall be no more than the proper width of the link, the heads or enlargements $a'$ $a^2$ $a^3$ $a^4$ are cut away at $k$ (see Figs. 8 and 9) corresponding with the sides of the link, and each of the two half-links A' A² is also recessed along the sides at $l$ for the halves B' B² of the box-like part to fit in. The box-like parts are recessed at $m$ to receive and fit against the parts $l$ of the half-links $A'$ $A^2$, which are inclosed between the box-like parts $B'$ $B^2$.

When the two halves $B'$ $B^2$ of the box-like part are secured together by the central screw $D$ or by a stud, rivet, or the like and inclose the enlarged ends $a'$ $a^2$ $a^3$ $a^4$ of the half-links $A'$ $A^2$, as above described and as shown in Figs. 1, 2, 3, and 4, the connecting-link is very strong, as the tensile strain on the half-links $A'$ $A^2$ is taken on their heads or enlarged ends $a'$ $a^2$ $a^3$ $a^4$ against the shoulders or abutments $i$ in the halves $B'$ $B^2$ of the box-like part, which latter is made strong enough to withstand the strain.

In the larger-size connecting-links the central screw-pin $D$ is by preference made separate from the halves of the box-like part, as shown in Figs. 1 and 2, and is made with a head $d'$ at one end, which fits in a recess $n$ in the one half $B^2$ of the box-like part, and the screw $D$ is locked by any convenient means—as, for instance, by its having a small square part $d^2$ formed on its fore end, which after the screw $D$ has been fixed in position to secure the parts of the link together said screw is secured in place by a lead washer $o$, which is forced into the screw-hole $f'$ and engages in channels $p$, (see Figs. 3 and 4,) which are cut in the box-like part $B'$. In the smaller-size links the pin which connects the two box-like parts together is by preference stamped in a piece with one half of the box-like part, as shown in Fig. 13. In this form (see Figs. 11, 12, and 13) $B^3$ $B^4$ are the two box-like halves, the part $B^4$ having the pin $q$ made integral therewith, and this pin passes through the hole $f^\times$ in the other box-like part, $B^3$, and after the parts of the link have been placed together the end of the pin $q$ is riveted over the outside of the hole $f^\times$, as in Fig. 11, so as to secure the two box-like parts $B^3$ $B^4$ and the two half-links $A'$ $A^2$ together.

The parts $A'$ $A^2$ $B'$ $B^2$ of the connecting-link above described are by preference made as steel stampings.

It will be seen that in the link above described there is no weld, as the two halves $A'$ $A^2$ of the links are by preference made from short pieces of bar-steel, which are bent and upset at the ends and are each stamped in one piece, and owing to the fact that there is no weld in the link one of the weaknesses of an ordinary oval chain-link or chain-cable link is obviated.

When using the connecting-link above described, it is only necessary to separate the two halves $B'$ $B^2$ of the box-like part, which is done by removing the central screw $D$, and then the two halves $A'$ $A^2$ of the link are detachable and can be threaded through end links of the chain or chain cable which it is desired to connect together, and then these two half-links $A'$ $A^2$ are placed in position and inclosed in the two halves $B'$ $B^2$ of the box-like part, and when these are secured together by the central pin or stud $D$, as above described, it will be found that the connecting-link will stand a considerably-higher tensile strain than will the ordinary links of nominally the same size chain or chain cable with which my improved connecting-link is used.

What I claim as my invention, and desire to secure by Letters Patent, is—

1. A connecting-link for chains and chain cables consisting essentially of two U-shaped half-links made with enlarged heads which abut together where they meet on the shorter diameter of the link, and a box-like part made in halves which meet together on the central longitudinal plane of the link and inclose the heads and end portions of the half-links, said halves of the box-like part being recessed to fit the heads and end portions of the half-links and means for connecting the halves of the box-like part together, substantially as set forth.

2. In a connecting-link for chains the combination of the two half-links having enlarged heads abutting each other, a box-like part made in two parts each of said parts having a recess therein in which the heads lie, and a bolt connecting the halves of the box-like part together.

In witness whereof I have hereunto set my hand in presence of two witnesses.

JOSEPH WILLIAM HILL.

Witnesses:
WILLIAM FOUTZ,
THOMAS JOHN ROWE.